No. 12,238. REISSUED JUNE 28, 1904.
N. E. BROWN.
DRAFT MECHANISM FOR TRACTION SLEDS.
APPLICATION FILED MAR. 11, 1904.
3 SHEETS—SHEET 1.
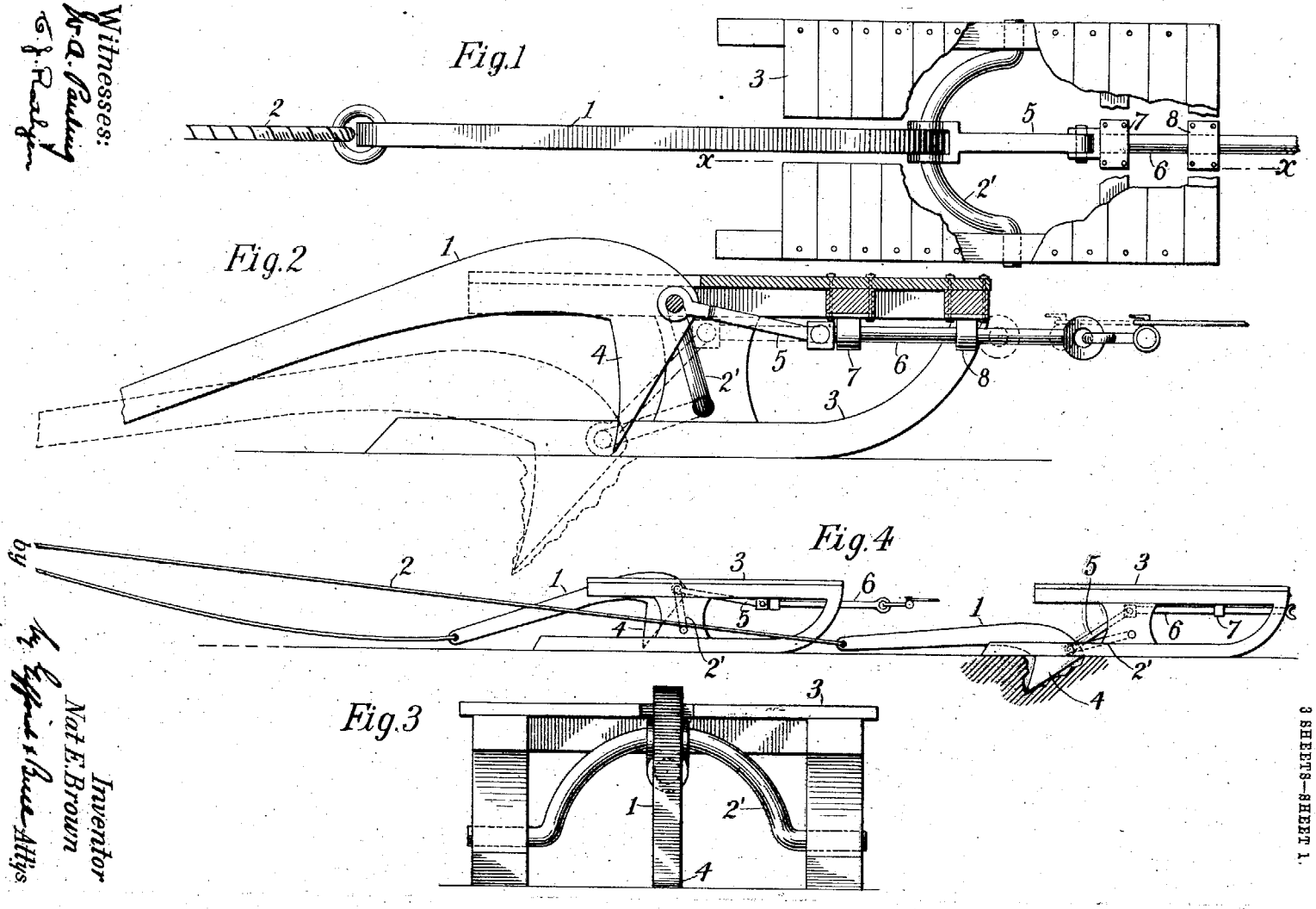
Witnesses:
W. A. Paulding
G. J. Roelofsen
Inventor
Nat E. Brown
by Effront & Bull Att'ys.

No. 12,238. REISSUED JUNE 28, 1904.

N. E. BROWN.

DRAFT MECHANISM FOR TRACTION SLEDS.

APPLICATION FILED MAR. 11, 1904.

3 SHEETS—SHEET 2.

Witnesses:
W. A. Bulling
G. J. Rathjen

Inventor
Nat E. Brown
by Griffin & Bull Att'ys.

No. 12,238. REISSUED JUNE 28, 1904.

N. E. BROWN.

DRAFT MECHANISM FOR TRACTION SLEDS.

APPLICATION FILED MAR. 11, 1904.

3 SHEETS—SHEET 3.

Witnesses:
W. A. Pauling
E. J. Rathjen

Inventor
Nat E. Brown
by Griffin & Bruce Att'ys

No. 12,238. Reissued June 28, 1904.

UNITED STATES PATENT OFFICE.

NAT ELMER BROWN, OF ROBBINSDALE, MINNESOTA.

DRAFT MECHANISM FOR TRACTION-SLEDS.

SPECIFICATION forming part of Reissued Letters Patent No. 12,238, dated June 28, 1904.

Original No. 750,586, dated January 26, 1904. Application for reissue filed March 11, 1904. Serial No. 197,730.

*To all whom it may concern:*

Be it known that I, NAT ELMER BROWN, a citizen of the United States, and a resident of Robbinsdale, in the county of Hennepin and State of Minnesota, have invented certain new and useful Improvements in Draft Mechanism for Traction-Sleds, of which the following is a full, clear, and exact description.

This invention relates to improvements in cable-draft mechanism for traction-sleds used in drawing logs or heavy loads over snow or ice, the object being to provide a quick and novel means for anchoring the forward ends of a doubled transmission-cable having the rear or intermediate portion connected with a winding-drum on an engine which is placed on a sled, the operation being in such a manner that while the portion used for draft is being wound on the drum the opposite portion is being unwound and laid forward for repeated use, and means for reversing the winding-drum simultaneously with each change of anchorage, so as to make the draft and forward motion practically continuous.

I will describe a draft mechanism for traction-sleds embodying my invention and then point out the novel features in the appended claims.

Reference is to be had to the accompanying drawings, forming a part of this specification, in which similar characters of reference indicate corresponding parts in all the figures.

Figure 5:
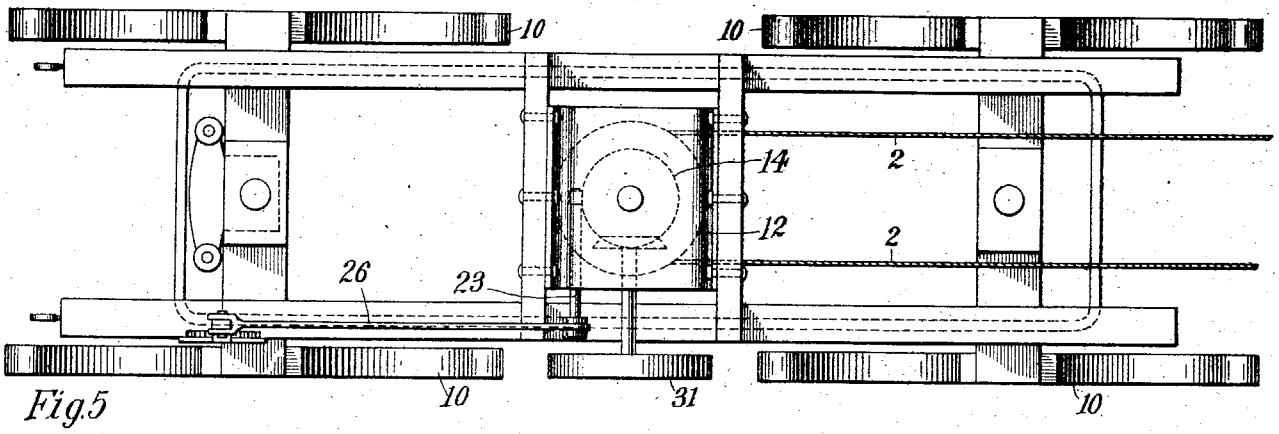
Figure 6:
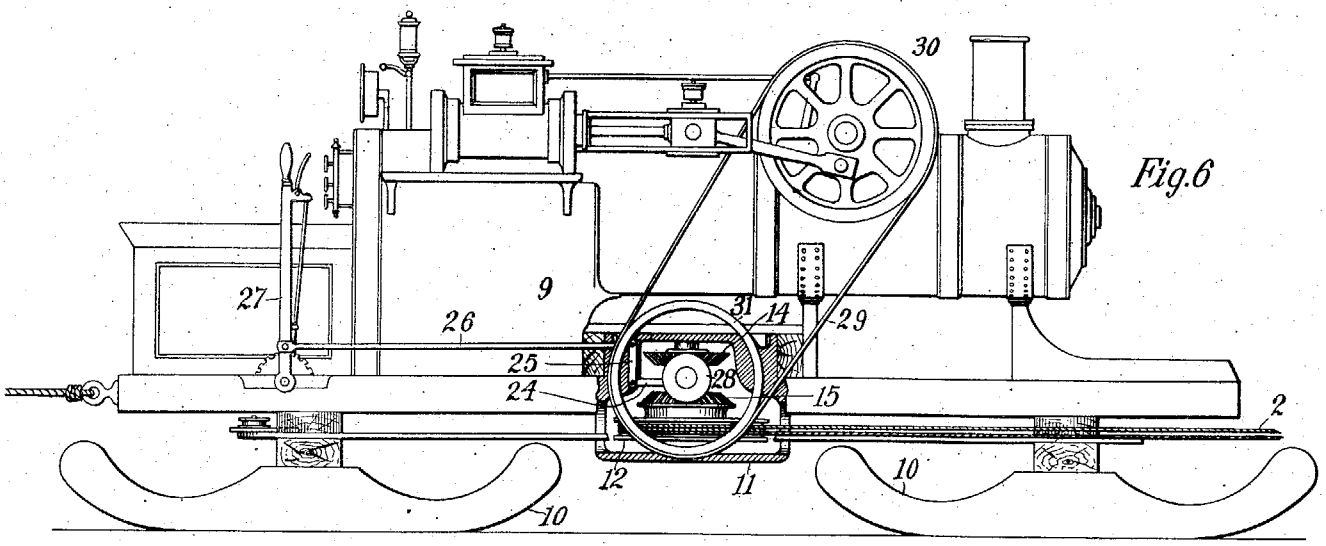
Figure 7:
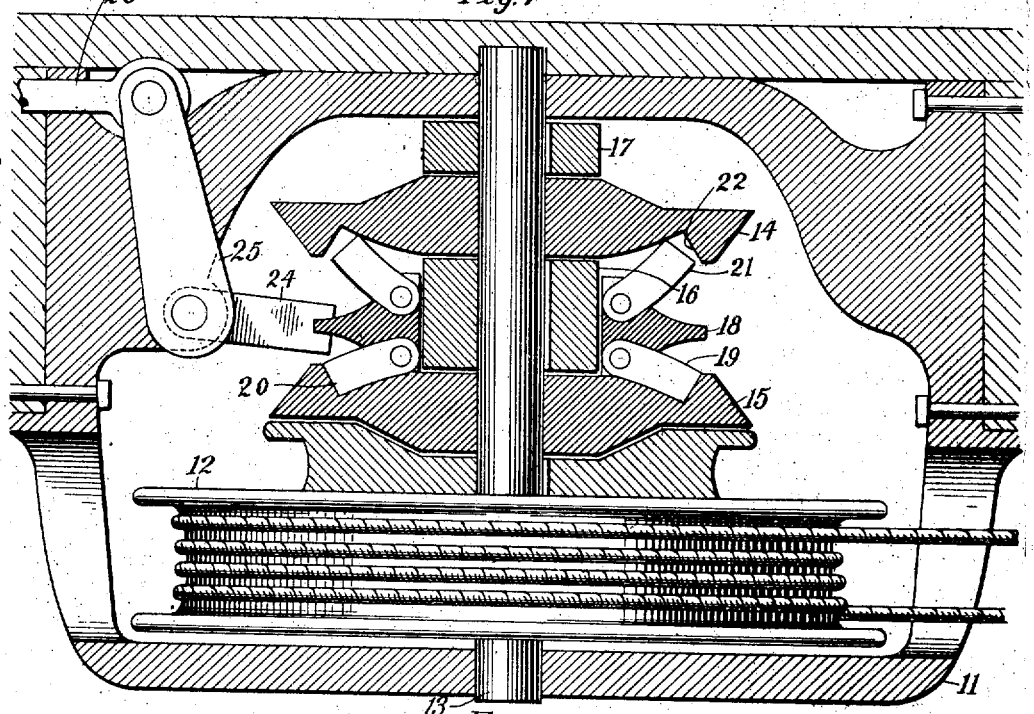
Figure 8:
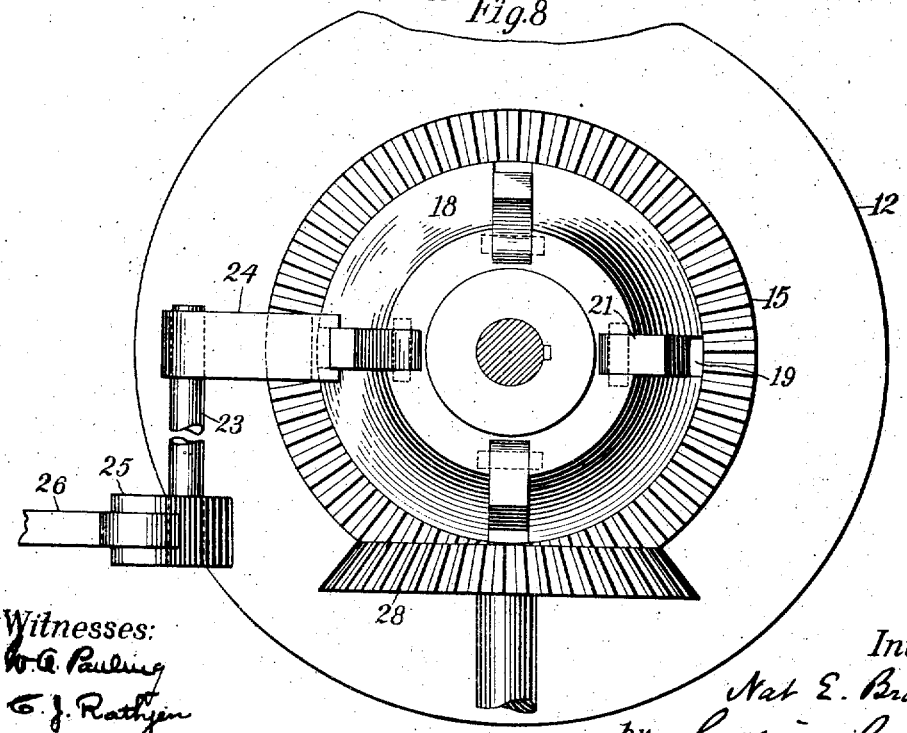

Figure 1 is a plan view of an anchoring device used in connection with my invention. Fig. 2 is a section on the line *x x* of Fig. 1. Fig. 3 is rear end view thereof. Fig. 4 is a side elevation showing the two anchoring devices. Fig. 5 is a plan view of a traction-sled employed. Fig. 6 is a side view thereof. Fig. 7 is a vertical section of the winding-drum clutch mechanism, and Fig. 8 is a horizontal section thereof.

In carrying out my invention I employ two anchoring devices carried by sleds, the said anchoring devices being attached to the two ends of a single transmission-cable or to the ends of two cables connecting with a drum operated by an engine on sleds. Each anchoring device consists of an arm or lever 1, to which the end of the transmission-cable 2 is attached. This arm or lever is mounted to swing on an upwardly-arched bar 2′, having swinging connection with a sled 3, and extended downward from the arm or lever is a pointed member 4, designed to be engaged in the ice or frozen ground or in a main used road to be dropped over holes prepared at intervals to correspond to the length of cable employed. This pointed member when in the frozen ground or ice is inclined rearward at such an angle as to cause the draft to force it downward. From the arched bar 2′ a link 5 extends to a connection with a draw-rod 6, mounted to slide in hangers 7 8, attached to the under side of the sled-platform. To this draw-rod 6 a draft-animal is designed to be hitched.

The engine 9 is mounted on runners 10, which are curved upward at both ends, so that the device may be moved readily in either direction.

Mounted in a frame 11, attached to the frame of the traction-sled, is a winding-drum 12, around which the cable 2 is designed to be wound for drawing the sled forward, and of course drawing the loaded sleds attached thereto. This winding-drum may be made of two diameters, as shown, so as to change the speed of movement. The drum is rigidly attached to a shaft 13, and upper and lower bevel-wheels 14 15 are loosely mounted on the shaft, and they are held separated by a collar 16, keyed to the shaft, while a collar 17 above the wheel 14 is also keyed to the shaft. Engaging loosely around the collar 16 is a clutch-member-carrying ring 18. Pivotally connected to this ring are clutch-fingers 19, adapted to engage with an interior annular surface 20, formed on the wheel 15, and clutch-fingers 21, mounted to swing on said ring, are designed to engage with an annular interior bearing-surface 22, formed on the wheel 14. The opposite sides of the ring 18 are beveled, so as to make a comparatively thin outer edge on said ring. From a rock-shaft 23 an arm 24 extends, and this arm is notched at its end, and into this notch the edge of the ring 18 passes, as clearly shown in Fig. 7. From an upwardly-extended arm 25 on the rock-shaft an operating-rod 26 extends to a connection with a lever 27, arranged on the frame of the sled, and obviously by operating this lever 27 in one direction the ring 18 will be moved downward, so that the clutch-fingers 19 will form a clutch connection between the wheel 15 and the collar 16, obviously causing the drum 12 to rotate in one direction. By moving the lever 27 in the opposite direction the ring 18 will be moved upward, causing the clutch connection with the wheel 14 to reverse the movement of the drum. These wheels 14 and 15 are both kept in constant motion in opposite directions by means of a bevel gear-wheel 28, having a band connection 29 with a wheel 30, driven from the engine. This band 29 does not engage directly with the gear-wheel 28, but extends around a band-wheel 31 on the shaft of the said gear-wheel.

In the operation one of the anchor-carrying sleds is to be drawn forward by a horse or other draft-animal to any suitable distance ahead of the traction-sled. The anchor is then dropped into its prepared hole or onto the frozen ground or ice, where it will gain a hold when the engine operates the winding-drum, causing the traction-sled to move forward. The anchor-carrying sled connected with a portion of the cable winding off the drum will be drawn forward the desired distance while the engine is winding on the draft side up to the anchored sled, when its anchor will be dropped, and simultaneously the drum will be reversed and the opposite anchor-sled moved forward. By this operation it will be noted that the forward movement of the traction-sled is practically continuous, and this result, it is obvious, could not be obtained with a single anchor and a single cable, because in shifting such single anchor the engine or traction-sled must necessarily be at a standstill. The anchoring-point 4 will be drawn out of the ice or snow or the hole in the ground by the forward pull of the draft-animal—that is, during the initial pull the draw-rod 6 will be drawn forward, swinging the arched bar 2′ upward, and consequently drawing the point 4 out of the ice, snow, or ground, as indicated in full lines in Fig. 2. Of course when the enlarged portion at the rear end of the rod 6 engages with the hanger 7 the sled will be drawn forward, carrying the weight of the anchor on the sled, also the man driving the horse.

Having thus described my invention, I claim as new and desire to secure by Letters Patent—

1. The combination with a traction-sled and winding mechanism operated by the engine thereon, of a transmission-cable engaging with the winding mechanism, and an anchoring device attached to each end of said cable.

2. The combination with a traction-sled and winding mechanism operated by the engine thereon, of a tranmission-cable engaging with the winding mechanism, means for operating the winding mechanism in opposite directions, and an anchoring device on each end of the cable.

3. The combination with a traction-sled and winding mechanism mounted thereon, of a driving connection between said winding mechanism and the engine on the sled, a clutch mechanism for changing the direction of rotation of the winding mechanism, a cable engaging with said winding mechanism, anchoring devices attached to the ends of the cable, and sleds on which said anchoring devices are mounted.

4. An anchoring device for the purpose described, comprising a sled, an arched bar mounted to swing on said sled, a pointed member having swinging connection with said arched bar, a draw-bar having a sliding connection with the sled, and a link connection between said draw-bar and the arched member.

5. The combination of a traction-sled with an engine thereon, and winding mechanism operating a cable-winding or draft side, and a cable-unwinding or delivering side behind or between two alternating anchoring devices.

6. An anchoring device for the purpose described, comprising a sled, an arched bar mounted to swing on the sled, an arm or lever having swinging connection with said bar, a pointed member extended downward from said arm or lever, the said pointed member being inclined rearward, a draw-bar having sliding connection with the sled, and a connection between said draw-bar and the arched bar.

In testimony whereof I have signed my name to this specification in the presence of two subscribing witnesses.

NAT ELMER BROWN.

Witnesses:

CARL E. OBERG,

E. M. OBERG.